United States Patent Office 2,795,940
Patented June 18, 1957

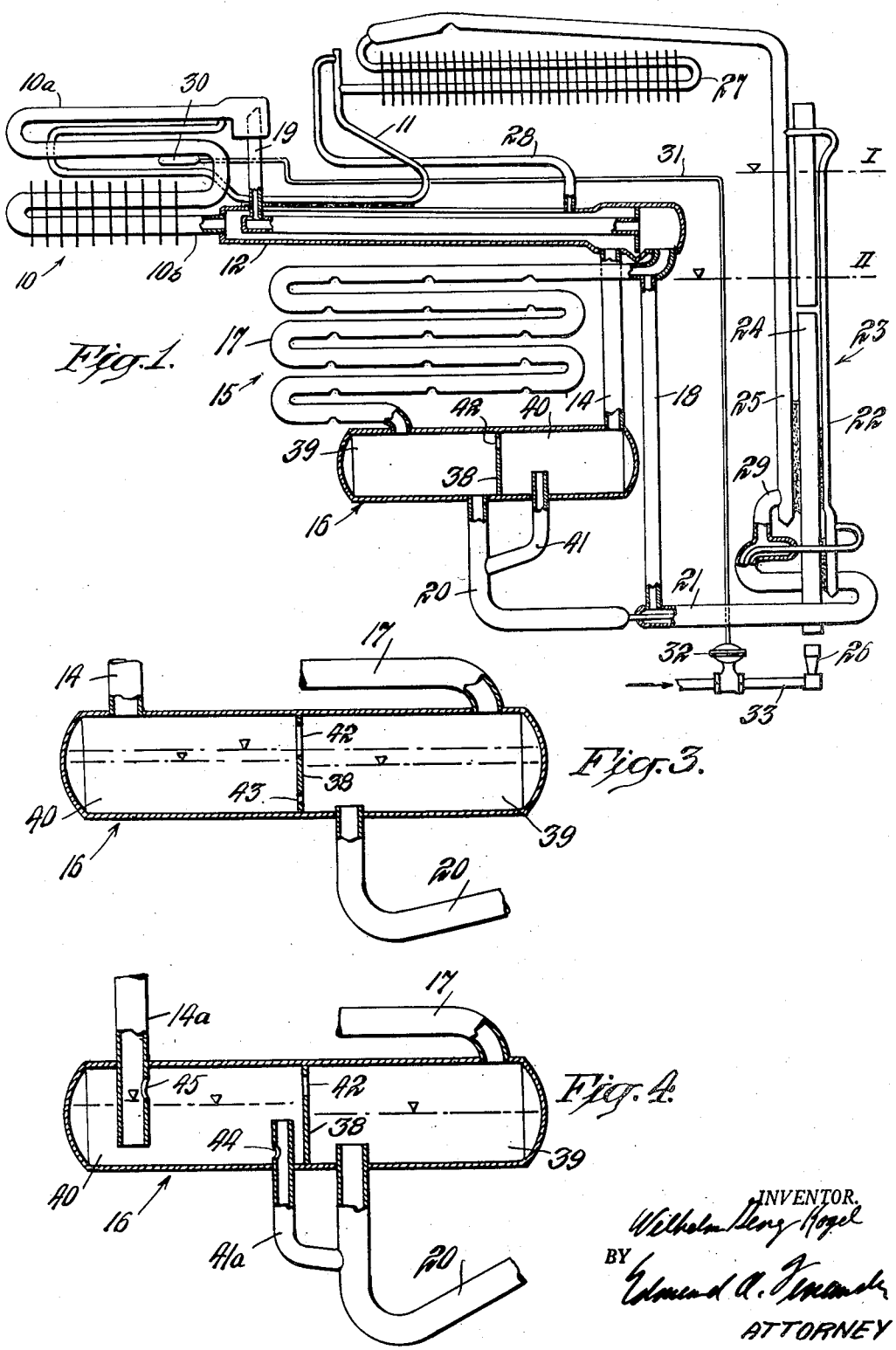

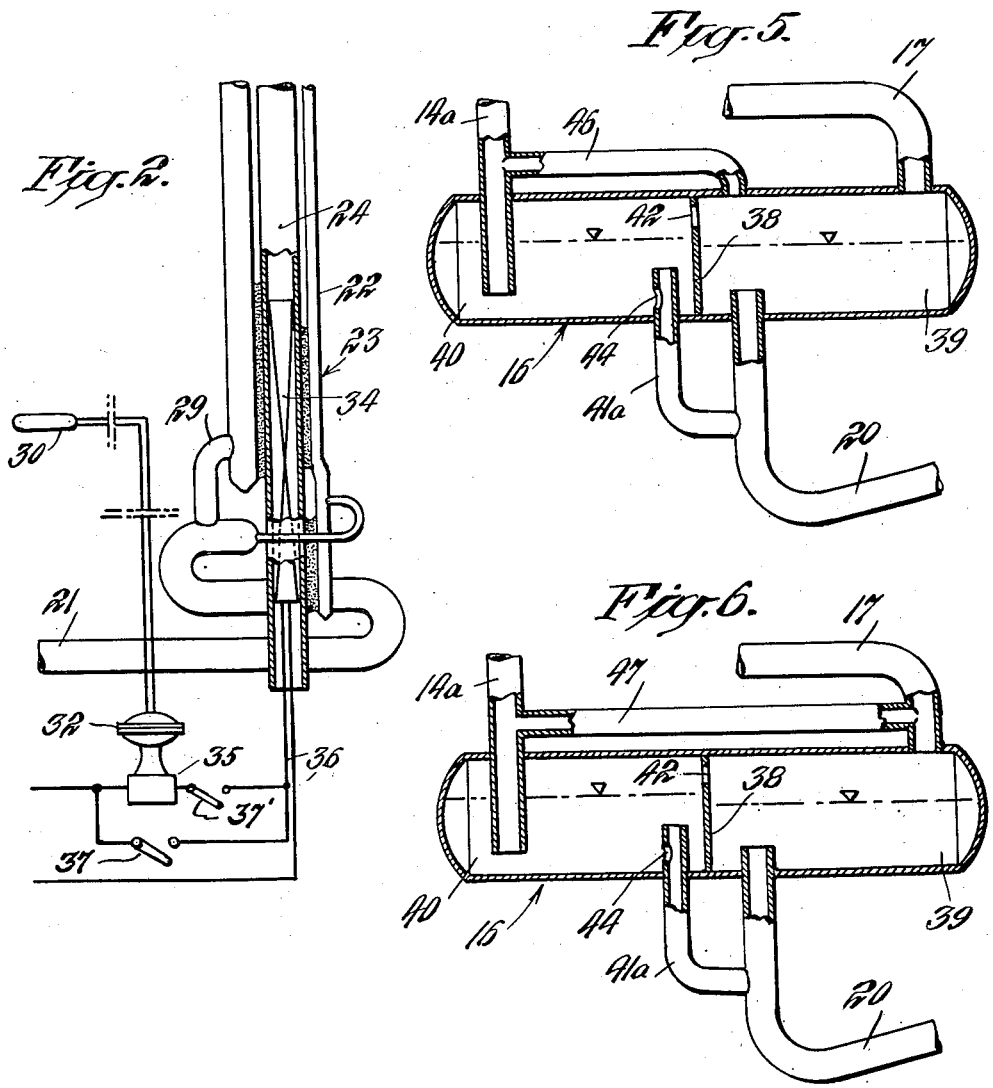

2,795,940
ABSORPTION REFRIGERATION

Wilhelm Georg Kogel, Stockholm, Sweden, assignor to Aktiebolaget Elektrolux, Stockholm, Sweden, a corporation of Sweden Continuation of application Serial No. 282,778, April 17, 1952. This application May 15, 1953, Serial No. 355,289

Claims priority, application Sweden April 26, 1951

21 Claims. (Cl. 62—119.5)

My invention relates to absorption refrigeration, and more particularly to such a refrigeration system employing an auxiliary pressure equalizing gas. This application is a continuation of my application Serial No. 282,778, filed April 17, 1952, now abandoned.

It is an object of my invention to provide an improvement in refrigeration systems of this kind for adjusting the concentration of refrigerant in the absorption liquid circuit in which liquid refrigerant is accumulated with variations in operating conditions and such accumulated refrigerant subsequently is positively introduced in a controlled manner into the absorption liquid circuit.

Another object of the invention is to provide such an improvement in which the accumulated refrigerant is introduced into the absorption liquid circuit by positive force produced and developed within the refrigeration system and without the need for relying upon the transfer or removal of liquid refrigerant by a physical phenomenon in which positive control is completely lacking, such as, for example, by liquid diffusion.

A further object of the invention is to provide such an improvement in which the accumulated refrigerant is positively introduced into the absorption liquid circuit at a rate more or less commensurate with the need or requirement for increasing the concentration of refrigerant in the absorption liquid circuit.

A still further object of the invention is to provide such an improvement in which the stored and accumulated refrigerant is positively introduced into the absorption liquid circuit in a controlled manner responsive to redistribution of absorption liquid in the absorption liquid circuit.

A still further object of the invention is to provide such an improvement in which redistribution of absorption liquid in its circuit is effected by modifying the normal circulation of liquid in the absorption liquid circuit.

A still further object of the invention is to provide such an improvement in which provisions external of the refrigeration system are operable to modify the normal circulation of absorption liquid in its circuit and effect a redistribution of liquid in the absorption liquid circuit.

A still further object of the invention is to provide such an improvement in which the normal circulation of the liquid in the absorption liquid circuit is modified by provisions external of the refrigeration system which control the heat supply to the system.

A still further object of the invention is to provide such an improvement for adjusting the concentration of refrigerant in the absorption liquid circuit in which liquid refrigerant is accumulated upon abnormal rise in ambient air temperature from a normal temperature range and such accumulated refrigerant subsequently is positively introduced in a controlled manner into the absorption liquid circuit upon decrease in ambient air temperature to a value in the normal temperature range.

The above and other objects and advantages of the invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing in which:

Fig. 1 illustrates more or less diagrammatically an absorption refrigeration system of the inert gas type embodying the invention;

Fig. 2 is a fragmentary view of a refrigeration system like that shown in Fig. 1 diagrammatically illustrating another manner of heating the system; and Figs. 3, 4, 5 and 6 are enlarged fragmentary views of parts like those shown in Fig. 1 illustrating other embodiments of the invention.

Referring to Fig. 1, I have shown my invention in connection with an air cooled absorption refrigeration system of a uniform pressure type in which an auxiliary pressure equalizing gas is employed. Systems of this type are well known and include a cooling unit or evaporator structure 10 which is arranged to abstract heat from the thermally insulated interior of a refrigerator cabinet. Refrigerant fluid, such as ammonia, passes through a conduit 11 into the cooling unit 10 and evaporates and diffuses therein into an inert gas, such as hydrogen, to produce a refrigerating effect. The resulting gas mixture of refrigerant and inert gas flows from cooling unit 10 through gas heat exchanger 12 and vertically extending conduit 14 into an air cooled absorber unit 15 comprising a vessel 16 and a looped coil 17.

In the absorber unit 15 refrigerant vapor is absorbed by a suitable absorbent, such as water, for example, which is introduced into coil 17 through a conduit 18. The hydrogen or inert gas, which is practically insoluble and weak in refrigerant, is returned to cooling unit 10 through gas heat exchanger 12 and a conduit 19. During operation of the refrigeration system, heat is liberated in the absorber unit 15 due to absorption of refrigerant vapor into absorption liquid. Such heat of absorption is given up to surrounding cool air which passes over the surfaces of the absorber unit and the temperature of which is determined by the temperature of the cool air flowing in thermal contact therewith.

The circulation of gas in the gas circuit just described is due to the difference in specific weight of the columns of gas rich and weak, respectively, in refrigerant vapor. Since the column of gas rich in refrigerant vapor and flowing from cooling unit 10 to the absorber coil 17 is heavier than the gas weak in refrigerant vapor and flowing from such coil to the cooling unit 10, a force is produced or developed within the system for causing circulation of inert gas in the manner described.

From the vessel 16 enriched absorption liquid, which is also referred to as absorption solution, is conducted through a conduit 20 and liquid heat exchanger 21 into a vapor lift pump 22 of a generator or vapor expulsion unit 23. The generator 23 comprises a heating tube 24 having the vapor lift pump 22 and a boiler pipe 25 in thermal exchange relation therewith. By heating generator 23, as by a fluid fuel burner 26, for example, liquid from the liquid heat exchanger 21 is raised by vapor lift action through pump 22 into the upper part of boiler pipe 25. The liberated refrigerant vapor entering boiler pipe 25 through the pump 22, and also vapor expelled from solution in the boiler pipe, flows upwardly into an air-cooled condenser 27.

Refrigerant vapor is liquefied in the condenser 27 by surrounding cooling air which flows over the surfaces of the coil and fins, and the liquefied refrigerant is returned to the cooling unit 10 through the conduit 11 to complete the refrigerating cycle. Liquid refrigerant flows by gravity in the cooling unit 10, the refrigerant flowing in parallel flow with the inert gas in a low temperature section 10a and then in a higher temperature section 10b of the cooling unit. The lower end of condenser 27 is connected by a conduit 28 to the gas circuit, as to the gas heat exchanger 12, for example, so that any non-condensable gas that may pass into the condenser will flow to the gas circuit and not be trapped in the condenser. The weakened absorption solution, from which refrigerant has been expelled, is conducted from boiler pipe 25 through a conduit 29, liquid heat exchanger 21 and conduit 18 into the upper part of absorber coil 17. Circulation of absorption solution in the manner just described is due to raising of liquid to a high level in boiler pipe 25 from which liquid can flow by gravity to the upper end of absorber coil 17 through conduit 18.

The refrigeration system just described may be controlled by a thermal bulb 30 which is affected by a temperature condition of cooling unit 10. As shown, the thermal bulb 30 is arranged in thermal exchange relation with the low temperature section 10a of cooling unit 10 and connected by a conduit 31 to a control device 32 which is connected in a fuel supply conduit 33 of burner 26. The thermal bulb 30 and conduit 31 may form part of an expansible fluid thermostat which is charged with a suitable volatile fluid and responds to changes in temperature of cooling unit 10 to operate control device 32, in a manner well known in the art.

When the temperature of cooling unit 10 increases due, for instance, to increase in heat load caused by placing of warm material in the thermally insulated interior of the refrigerator, or rise in room air temperature, the thermal bulb 30 in normal operation of the refrigeration system becomes effective to operate control device 32 to increase the supply of fuel to burner 26. This increases the heat input and hence the rate at which refrigerant vapor is expelled from solution in generator 23, thereby increasing the amount of refrigerant vapor which condenses in condenser 27 and flows into cooling unit 10. Conversely, when the temperature of cooling unit 10 decreases, the thermal bulb 30 becomes effective to operate control device 32 to decrease the supply of fuel to burner 26. This reduces the heat input and hence the rate at which refrigerant vapor is expelled from solution in generator 23, thereby decreasing the amount of refrigerant vapor which condenses in condenser 27 and flows into cooling unit 10.

The thermostatic control just described is of the kind in which the supply of fuel desirably is reduced to such an extent that substantially no vapor is expelled from solution in generator 23 when the cooling unit 10 reaches a predetermined low temperature. In other words, under these conditions only a sufficient quantity of fuel is supplied to the burner 26 to maintain the latter ignited and only heat of liquid is supplied to the solution in generator 23 at such times. When the fuel supply to burner 26 is inadequate for the burner to supply heat of vaporization to the solution in the generator, no expulsion of refrigerant vapor from solution will take place and the solution will be maintained below its boiling temperature. Since no expulsion of vapor from solution will take place in generator 23 when the supply of fuel to burner 26 is reduced sufficiently by the thermostatic control in the manner just explained, no lifting of liquid by vapor lift action will take place in the vapor lift pump 22 under these conditions and the circulation of absorption solution through and between the generator 23 and absorber unit 15 will stop. Hence, when the thermostatic control provided acts to reduce the supply of fuel to burner 26 and refrigerant vapor is no longer expelled from solution in the generator 23 and pump 22 is no longer effective to raise liquid to cause circulation of absorption solution, the supply of heat to the generator 23 for the purpose of producing useful refrigeration is interrupted and essentially cut-off for all practical purposes.

In Fig. 2 is illustrated another manner of supplying heat to the generator 23 by an electrical heating element 34 disposed within the lower part of heating tube 24. In this instance the control device 32 forming part of the expansible fluid thermostat is operatively associated with a switch 35 connected in one of the conductors 36 for supplying electrical energy to heating element 34. The control arrangement of Fig. 2 is of the "on" and "off" type in which the thermal bulb 30 becomes effective to cause control device 32 to close switch 35 and energize heating element 34 when the temperature of cooling unit 10 increases due to increase in load. Conversely, when the cooling unit 10 reaches a predetermined low temperature the thermal bulb 30 becomes effective to cause control device 32 to open switch 35 and disconnect heating element 34 from the source of supply of electrical energy. In Fig. 2 switches 37 and 37' are associated with the thermostatistically controlled switch 35 for controlling the supply of electrical energy to the heating element 34.

In accordance with my invention an improvement is provided for adjusting the concentration of refrigerant in the absorption liquid circuit by accumulating and storing liquid refrigerant with variations in operating conditions, and subsequently introducing such stored liquid refrigerant into the absorption liquid circuit in a controlled manner and at a rate more or less commensurate with the need or requirement for increasing the concentration of refrigerant in the absorption liquid circuit. I accomplish this in Fig. 1 by providing in the shell or container 16 in the absorption liquid circuit a baffle or partition 38 to form adjacent spaces or vessels 39 and 40. The vessel 39 functions as the absorber vessel having a liquid inlet at the upper end thereof which communicates with the lower end of the absorber coil 17 and in which is maintained a body of absorption liquid enriched in refrigerant. The vessel 39, through which flow of liquid is effected from the lower end of coil 17 to the conduit 20 connected thereto, forms an active portion of the absorption liquid circuit in which the liquid normally circulates during operation of the refrigeration system.

The vessel 40 functions as an accumulation vessel in which unevaporated refrigerant passing from the cooling unit or evaporator 10 is stored. In the system of Fig. 1 such excess or unevaporated refrigerant accompanies the enriched inert gas passing from the lower end of the evaporator and flows through the outer passage of gas heat exchanger 12 and conduit 14 into the vessel 40. Not only does unevaporated refrigerant pass into vessel 40, but absorption liquid can also pass into this vessel through a conduit 41 which is connected to conduit 20. Hence, a region below the liquid surface level of the liquid body in vessel 40 is in free liquid communication with a region below the liquid surface level of the liquid body in vessel 39, the connecting passage provided by the conduit 41 being completely filled with liquid under all operating conditions of the system. Free liquid communication is established between the liquid bodies in vessels 39 and 40 in such a manner that the vessel 40 constitutes a part which is disposed outside the active portion of the absorption liquid circuit and in which normal flow of absorption liquid is absent.

It will now be understood that a body of absorption liquid is held in the absorber vessel 39 and that absorption liquid passes through conduit 41 into the vessel 40. Under certain operating conditions unevaporated refrigerant also passes from evaporator 10 into the vessel 40 and accumulates therein. The inert gas enriched in refrigerant and flowing from evaporator 10 into vessel 40 passes through the vapor space of vessel 40 and then enters the vapor space of absorber vessel 39 through an opening 42 in the upper part of partition 38. From vessel 39 inert gas enriched in refrigerant flows upwardly through coil 17 in counterflow to absorption liquid flowing downwardly therein.

As long as the liquid surface level in accumulation vessel 40 remains below the opening 42 in partition 38, the unevaporated liquid refrigerant accumulated therein essentially will be withdrawn from the absorption liquid circuit. Such refrigerant will be absorbed into absorption liquid held in vessel 40 and increase the concentration of refrigerant in such absorption liquid to a value materially greater than the concentration of refrigerant in the absorption liquid in vessel 39 which flows therefrom through conduit 20. By reason of the free liquid communication provided by conduit 41 between the liquid body in vessel 40 and the active portion of the absorption liquid circuit, some transfer of accumulated refrigerant by diffusion from vessel 40 into the active portion of the absorption liquid circuit cannot be avoided. Such diffusion may be defined as the phenomenon by which equalization of the concentration of refrigerant in the liquid body in vessel 40 and in the liquid body in vessel 39 is effected. Transfer of refrigerant from vessel 40 into the active portion of the absorption liquid circuit by diffusion possesses the disadvantages that such transfer takes place relatively slowly and without the benefit or exercise of any control by reason of the very phenomenon involved that makes such transfer of liquid refrigerant possible.

However, in accord with the principles of the invention as embodied in Fig. 1, stored liquid refrigerant in vessel 40 can be positively introduced in a controlled manner into the active portion of the absorption liquid circuit. Stated broadly, transfer of stored liquid refrigerant from vessel 40 is initiated by effecting a redistribution of absorption liquid in the absorption liquid circuit which results in changing or varying the quantity of absorption liquid held in vessel 39. How such redistribution of absorption liquid is effected in its circuit may best be explained by pointing out what happens during normal circulation of absorption liquid during operation of the system. In the generator 23 liquid is raised by vapor lift pump 22 from a low level to a higher level in boiler pipe 25 which is designated I in Fig. 1. Absorption liquid flows from the level I in generator 23 and overflows from the upper end of conduit 18 into the upper end of the absorber coil 17 at the level II. The quantity of liquid held in boiler pipe 25 between the levels I and II defines the static pressure head required to overcome the resistance offered to flow of liquid from the boiler pipe to the upper end of the absorber coil 17.

When the heat supply to the generator 23 is reduced sufficiently to render the vapor lift pump 22 inactive or ineffective to raise absorption liquid to the level I, normal circulation of liquid in the absorption liquid circuit stops and the quantity of liquid held in boiler pipe 25 between the levels I and II spills over into the upper end of absorber coil from conduit 18; that is, liquid continues to overflow from conduit 18 until the liquid level in this conduit and in boiler pipe 25 are substantially the same. Hence, a part of the absorption liquid which usually remains in the generator 23 during normal circulation of the absorption liquid is shifted and transferred into another part of the absorption liquid circuit when the normal circulation of such liquid is modified. In the embodiment of Fig. 1 liquid transferred from boiler pipe 25, when the pump 22 becomes inactive, collects in the absorber vessel 39. In addition, liquid contained in the absorber coil 17 and wetting the inner wall surfaces thereof will also flow downwardly therefrom into the absorber vessel 39, thereby increasing the quantity of absorption liquid held in vessel 39 and raising the liquid surface level therein.

When ammonia and water are employed as the refrigerant and absorption liquid, respectively, and unevaporated ammonia passes from the evaporator 10 and accumulates in vessel 40 and forms a part of the liquid body therein, the liquid surface level in vessel 40 will be higher than that in vessel 39 depending upon the increase in concentration of ammonia in the absorption liquid in vessel 40. This is so because, as unevaporated ammonia collects in vessel 40, the specific gravity of the absorption liquid in that vessel decreases and a liquid body of greater height is required in vessel 40 to balance the body of absorption liquid of less height in vessel 39. When unevaporated ammonia has accumulated in vessel 40 and absorption liquid held in other parts of the system is transferred to the absorber vessel 39, the quantity of liquid in the latter increases and the liquid surface level therein rises. When the liquid surface level in vessel 39 increases, a similar increase in liquid surface level also takes place in vessel 40. Since the liquid surface in vessel 40 is at a higher level than in vessel 39 when liquid refrigerant has accumulated in the former, as just explained, and the liquid surface levels in both vessels increase when an adequate quantity of absorption liquid is transferred to vessel 39, it will be evident that liquid in vessel 40 will be the first to reach the opening 42 and overflow therethrough into vessel 39. In this way liquid refrigerant accumulated and stored in vessel 40 can be positively transferred therefrom into vessel 39 which, as previously explained, forms a part of the active portion of the absorption liquid circuit. Further, such removal of liquid refrigerant from vessel 40 into the active portion of the absorption liquid circuit is effected by a force produced and developed in the refrigeration system as the direct result of the redistribution of liquid in the absorption liquid circuit.

Since the redistribution of absorption liquid in the absorption liquid circuit from boiler pipe 25 into absorber vessel 39 is initiated when the vapor lift pump 22 is rendered inactive, it will now be understood that the thermostatic control for the refrigeration system constitutes structure externally of the system which is operable to modify the normal circulation of the absorption liquid in the active portion of its circuit and vary the quantity of absorption liquid held in the vessel 39. Further, liquid refrigerant is transferred from vessel 40 to vessel 39 responsive to increase in the surface level of liquid in the latter, such transfer of liquid being effected at a rate faster than that at which liquid refrigerant can be transferred by diffusion from vessel 40 through conduit 41 to the active portion of the absorption liquid circuit.

Let us assume that an air cooled refrigeration system generally like that shown in Fig. 1 and described above is charged with ammonia, hydrogen and water so that the system will operate in a satisfactory manner in a normal temperature range of about 68° F.; and that the concentration of ammonia in the rich absorption liquid formed in the absorber 15 is in a range of about 33 to 37 percent. When the circulation pump 22 in the absorption liquid circuit is operating, an equilibrium condition is established in which absorption liquid flows at a certain rate into vessel 39 and is withdrawn therefrom to the generator 23 at essentially the same rate and the liquid surface levels in the vessels 39 and 40 are practically constant. Under these conditions the liquid column in vessel 39 and upper part of conduit 20 balances the liquid column in vessel 40 and conduit 41, the gas pressures acting on the liquid surfaces of the liquid bodies in vessels 39 and 40 being the same.

Active circulation of absorption liquid only takes place through vessel 39 during normal operation and the conduit 41 and vessel 40 essentially constitute a dead-end appendage for absorption liquid in which the liquid body is more or less stagnant. In such normal operation of the system the thermostatic control will be operable to shut-off the heat supply to the generator 23 when the evaporator 10 reaches a predetermined low temperature; and it also may be assumed that the thermostatic control will shut-off and start the heat supply to the generator 23 comparatively frequently, such as, for example, once an hour, in a normal temperature range and at normal load. Also, the absorber vessel 39 will function in the normal manner explained above and the concentration of refrigerant in the liquid held in the vessels 39 and 40 will be approximately the same. When there is a slight change in the liquid level in vessel 40 during normal operation of the system there is a corresponding change in the liquid level in vessel 39, because the liquid columns of these liquid bodies balance one another.

Let us now assume that the ambient air temperature increases to about 108° F. so that the heat of absorption produced in the absorber 15 under the new operating conditions is not effectively given up to the ambient air flowing in thermal relation therewith. Under such conditions refrigerant vapor is not effectively absorbed into absorption liquid in the absorber 15, and inert gas will flow to evaporator 10 having an abnormally high concentration of refrigerant vapor so that the evaporator 10 will not be capable of producing the desired low refrigerating temperature for which the thermostatic control is adjusted. Under these assumed conditions, the thermostatic control will function to continue the heat supply to the generator 23. By reason of the abnormally high partial pressure of refrigerant vapor in the inert gas introduced into the evaporator 10, all of the liquid refrigerant supplied to the evaporator will not be evaporated therein and the excess unevaporated refrigerant passing from the evaporator 10 will flow to the vessel 40 in which it is accumulated and stored. By storing unevaporated liquid refrigerant in vessel 40, such refrigerant in effect is withheld or withdrawn from the absorption liquid circuit; and the concentration of refrigerant in the absorption liquid eventually will be reduced adequately so that absorption liquid having a sufficiently low concentration of refrigerant will be supplied to absorber 15 from generator 23. This will enable the absorber to function properly even at the higher ambient air temperature, thereby enabling the absorber to supply inert gas to evaporator 10 which is sufficiently poor in refrigerant vapor to cause substantially all of the liquid refrigerant to evaporate in the evaporator 10 and gas heat exchanger 12.

When the ambient air temperature decreases from the high value assumed above and begins to approach the normal temperature range, it is highly desirable to increase the concentration of refrigerant in the absorption liquid as soon as possible. This is so because, in the lower or normal temperature range, such increase in concentration of refrigerant in the absorption liquid makes it possible to operate the generator 23 at a lower temperature which means that the radiation losses will be reduced, the generator can be operated with less heat input, and the rectification losses will be decreased.

In view of the foregoing, it will now be understood that liquid refrigerant in the system will be accumulated in vessel 40 and the concentration of refrigerant in the absorption liquid circuit is automatically reduced in accordance with changes in temperature of the ambient air. As previously explained, there is very little transfer of liquid refrigerant by diffusion from vessel 40 to the active portion of the absorption liquid circuit. This end result can be accomplished by proper design and dimension of the fluid communication between the vessels 39 and 40 of Fig. 1. By reason of the relatively small difference in concentration of refrigerant in the liquid bodies held in vessels 39 and 40, the fluid communication provided in Fig. 1 can be replaced by a small opening 43 in the partition 38, as illustrated in the embodiment of Fig. 3. The area of the opening 43 desirably should correspond to the area of a circular opening having a diameter of about 3 mm.

Under normal operating conditions when the thermostatic control intermittently shuts off and subsequently starts the heat supply to the generator 23, all of the liquid refrigerant delivered to the evaporator 10 will evaporate therein and in the gas heat exchanger 12 and the concentration of refrigerant in the liquid bodies held in vessels 39 and 40 will be substantially the same. However, when excess liquid refrigerant passes from evaporator 10 and accumulates in vessel 40, the concentration of refrigerant in the liquid in that vessel will increase; and, due to decrease in specific gravity of the absorption liquid in vessel 40, the liquid surface level therein will rise above the liquid surface level in vessel 39. While the accumulation of liquid refrigerant in vessel 40 will also cause a small increase in the quantity of liquid held in vessel 39 by reason of the fluid communication between these vessels, such intermittent transfer of liquid from vessel 40 to vessel 39 does not adversely affect the operation of the system as described above, particularly in regard to adjusting the concentration of refrigerant in the absorption liquid circuit with variations in operating conditions.

In accord with the invention, this end result is accomplished by providing a container or shell 16 in which the quantity of absorption liquid that can be held or stored therein is sufficiently large, compared with the entire quantity of absorption liquid required in the absorption liquid circuit, so that the concentration of refrigerant in the liquid body in vessel 40 will be maintained relatively low. Under such conditions the relatively small amounts of liquid refrigerant flowing through conduit 41 in Fig. 1 or opening 43 in Fig. 3 into vessel 39 will not influence the concentration of refrigerant in the relatively large liquid body held in vessel 39, even when liquid passes into the latter through opening 43 in Fig. 3, for example, in an amount which corresponds to the amount of liquid refrigerant flowing to and accumulating in vessel 40. To this end the vessels 39 and 40 are of such size that the quantity of absorption liquid that can be held or stored in vessel 39 and the quantity of liquid that can be held or stored in vessel 40 together comprise more than from fifty to seventy percent of the entire quantity of absorption liquid in the absorption liquid circuit of the system. Further, the quantity of liquid that can be held or stored in the vessel 40 comprises more than one-third of the combined quantity of liquid that can be held or stored in the vessels 39 and 40.

It will now be evident that the system of Fig. 1 embodies provisions external of the system operable to modify the normal circulation of absorption liquid in the active portion thereof and vary the quantity of absorption liquid held in vessel 39. In the preferred embodiment disclosed, the normal circulation of absorption liquid in its circuit is modified by shutting off the heat supply to generator 23 sufficiently to render vapor lift pump 22 inactive. In Figs. 1 and 2, shutting off the heat supply can be effected automatically by the thermostatic control, which is operable responsive to a temperature condition affected by evaporator 10, for controlling the heater 26 in Fig. 1 or heater 34 in Fig. 2.

When liquid refrigerant does accumulate in vessel 40 and the concentration of refrigerant in the absorption liquid circuit is reduced to promote proper functioning of the absorber, the operation of the system will reach a more or less state of equilibrium until the operating conditions are changed or varied. In the assumed situation discussed above, it may be further assumed that the ambient air temperature now decreases, as during the night time, for example which in turn decreases, the load on the system sufficiently to enable the evaporator 10 to reach the predetermined low temperature at which the thermostatic control shuts off the supply of heat to generator 23. As explained above, this will interrupt the normal circulation of absorption liquid and cause such liquid to be transferred to the vessel 39 from other parts of the system. By reason of the free liquid communication between the vessels 39 and 40 which is always completely filled with liquid under all operating conditions of the system, absorption liquid will flow from vessel 39 through the upper part of conduit 20 and conduit 41 into vessel 40 in Fig. 1 and through the opening 43 in Fig. 3 when absorption liquid is transferred to vessel 39. When an adequate quantity of absorption liquid is transferred to the vessel 39 from other parts of the system, liquid refrigerant will be transferred from vessel 40 to vessel 39 through the opening 42 in partition 38 responsive to increase in liquid level in the vessel 39. The liquid remaining in accumulation vessel 40 will be diluted to some extent by the absorption liquid which passes therein from the absorber vessel 39 through conduits 20 and 41 in Fig. 1 and opening 43 in Fig. 3. Accordingly, the absorption liquid passing into vessel 40 through the free liquid communication passage from the vessel 39 will reduce the concentration of refrigerant in the liquid in vessel 40 and there will be a tendency for the refrigerant concentration to equalize in the liquid bodies in vessels 39 and 40.

After an interval of time, the temperature of evaporator 10 will rise sufficiently to cause the thermostatic control to function and start the heat supply to the generator 23 at which time pump 22 becomes active. Liquid will now be withdrawn from vessel 39 since it forms a part of the active portion of the absorption liquid circuit. At the same time some liquid will also be withdrawn from vessel 40 by the pump 22, although it should be understood that normal circulation of absorption liquid in this vessel usually is absent. After the pump 22 starts raising liquid into the upper end of boiler pipe 25, an interval of time will pass before absorption liquid again flows into vessel 39. Hence, the entire quantity of liquid held in the container or shell 16 will be reduced to an extent corresponding to the accumulation of liquid in the shell 16 when the normal circulation of absorption liquid is reduced and liquid is transferred to absorber vessel 39. When the new pumping period commences, the part of boiler pipe 25 between the levels I and II is depleted of liquid; and the absorber coil 17 can accumulate a comparatively large amount of liquid at the inner wall surfaces thereof, due to the action of capillary and adhesive forces, before a stream of liquid passes through the entire length of the absorber coil.

When absorption liquid again enters vessel 39 from coil 17 and an equilibrium condition is established, the liquid levels in vessels 39 and 40 will be essentially the same due to the free liquid communication therebetween and the same gaseous atmosphere enveloping the liquid bodies in both vessels. When excess liquid refrigerant enters vessel 40 through conduit 14, the liquid surface level in vessel 40 will rise. Under such conditions, the only flow of liquid from vessel 40 to the absorption liquid circuit will be that quantity necessary to maintain a balancing liquid head in the vessel 39.

It has been stated above that liquid in accumulation vessel 40 will overflow into vessel 39, through the opening 42 in partition 38, when the liquid surface level in vessel 40 rises sufficiently responsive to transfer of absorption liquid into absorber vessel 39 from other parts of the absorption liquid circuit. When this occurs a substantial quantity of absorption liquid flows into accumulation vessel 40 from absorber vessel 39 through the free liquid communication therebetween, such absorption liquid being mixed with liquid refrigerant in the accumulation vessel 40. In this way liquid refrigerant is returned through the opening 42 in the partition 38 into the active portion of the absorption liquid circuit. Since liquid will be withdrawn from vessel 40 as well as from vessel 39 when the pump 22 is again started following a shut down period, as explained above, liquid refrigerant in vessel 40, which has mixed with absorption liquid flowing therein, is also returned to the active portion of the absorption liquid circuit when such mixture is withdrawn downwardly therefrom by the pump 22 after it becomes active. In the event the quantity of absorption liquid that flows into accumulation vessel 40 from the absorber vessel 39 is such that the liquid surface level in vessel 40 does not rise to the level of the opening 42 and does not overflow therethrough, mixing of absorption liquid with liquid refrigerant in vessel 40 can still occur with adequate redistribution of absorption liquid in its circuit. When the pump 22 again becomes active under these conditions, a part of such mixture will be withdrawn from vessel 40 and returned to the absorption liquid circuit for flow to the generator 23.

In view of the manner in which normal circulation of absorption liquid is resumed, a certain amount of absorption liquid relatively rich in refrigerant will pass from vessel 40 into the active portion of the absorption liquid circuit when pumping is resumed following a shut down period. For this reason it is desirable to elect more or less the maximum average concentration of refrigerant that will be maintained in vessel 40, so that complete equalization of the refrigerant concentration in the liquid bodies in vessels 39 and 40 will not be effected when the thermostatic control functions a single time to render pump 22 active to start normal circulation of absorption liquid. Accordingly, the ratio of the liquid contents of the vessels 39 and 40 desirably should be such that adequate dilution is obtained of substantially pure refrigerant introduced into vessel 40 through conduit 14. While it has been stated above that the quantity of liquid that can be held or stored in vessel 40 desirably should be about one-third of that of vessel 39, it should be understood that in different situations this may vary so that the quantity of liquid that can be held or stored in vessel 40 may be from 50 to 30 percent of the quantity of liquid that can be held or stored in vessel 39.

Under certain conditions the changes in ambient air temperature may cause the thermostatic control to function in such a manner that the supply of heat to the generator 23 will start and subsequently stop a number of times before an equilibrium condition in the system is again established. As previously explained, such an equilibrium condition is reached when the system has again acted to reduce the concentration of refrigerant in the absorption liquid due to abnormal increase in ambient air temperature from a normal temperature range. Hence, the thermostatic control may switch off and start the supply of heat as much as five times before the equilibrium condition just referred to is again attained. Accordingly, the change in the quantity of absorption liquid maintained in the vessel 40 may be effected intermittently in several steps and cause liquid refrigerant to flow intermittently from vessel 40 to vessel 39 through which absorption liquid is circulated in several steps with the successive changes in the quantity of absorption liquid maintained in vessel 39.

In view of the foregoing, it will evident that the liquid levels in the vessels 39 and 40 of the container 16 can be changed automatically, as by operation of the thermostatic controls shown in Figs. 1 and 2, for example, so as to change the ratio between the rate at which liquid is introduced into vessel 39 and the rate at which liquid is withdrawn therefrom. In the preferred embodiment this is accomplished by changing the manner in which liquid circulates through the generator portion 23 of the absorption liquid circuit which includes the pump 22 and boiler pipe 25. In the embodiment of Fig. 1 both the manner in which liquid is withdrawn from absorber vessel 39 and liquid is supplied thereto are influenced by the control exercised over the heat supply to the refrigeration system.

In order to promote mixing of refrigerant with absorption liquid in the liquid bodies in vessels 39 and 40 and also promote the reintroduction of accumulated refrigerant from vessel 40 into vessel 39, the fluid connections for vessel 40 may be generally like those shown in Fig. 4. In Fig. 4 the bottom part of vessel 40 is in communication with the bottom part of vessel 39 by a conduit 41a and the upper portion of conduit 20, in a manner similar to that illustrated in Fig. 1. An opening 44 is provided in the wall of conduit 41a at a region closely adjacent to and immediately above the bottom part of vessel 40. When the heat supply to the generator 23 is shut off and the liquid level in vessel 40 rises responsive to increase in liquid level in vessel 39, the opening 44 allows liquid passing from vessel 39 through conduit 41a to be distributed more effectively in vessel 40.

Similarly, the conduit 14a in Fig. 4 extends downwardly in vessel 40 such a distance that the extreme lower open end thereof is approximately at the same level as the opening 44 in conduit 41a. The portion of conduit 14a within vessel 40 is formed with a vent opening 45 through which inert gas enriched in refrigerant and flowing downward in conduit 14a can pass into the vapor space of vessel 40 and flow therefrom into the lower end of absorber coil 17. The portion of conduit 14a below the opening 45 is immersed in the liquid body in vessel 40 and serves to collect liquid refrigerant flowing downwardly from evaporator 10 in conduit 14a. Liquid refrigerant collecting in the lower part of conduit 14a emerges from the extreme lower end thereof and mixes with absorption liquid below the liquid surface level in vessel 40. In this way the refrigerant gradient in the main body of absorption liquid in vessel 40 is reduced and kept as small as possible and accumulation of refrigerant will be effected more rapidly. Stated another way, the arrangement just described avoids the likelihood that the top surface layer of liquid in vessel 40 will have too high a concentration of refrigerant and promotes dispersion of a larger quantity of refrigerant through the entire mass of liquid in vessel 40. When the refrigerant concentration of the entire body of liquid in vessel 40 is relatively uniform, an interruption in the heat supply to generator 23 will not cause an unduly large amount of liquid refrigerant to be transferred from vessel 40 to vessel 39 which would be the case if the concentration of refrigerant in the surface layer in vessel 40 is relatively high.

The arrangement in Fig. 4 possesses the advantage that the system is less sensitive when the concentration of refrigerant in the absorption liquid circuit is being adjusted, and in practice it has been discovered that transfer of liquid refrigerant from vessel 40 to vessel 39 is effected more nearly at a rate which is commensurate with the prevailing operating conditions initiating and bringing about the need for increasing the refrigerant concentration in the absorption liquid circuit. In certain situations it has been found that, upon each interruption of the heat supply to the generator, it may be desirable to bring about only a part of the requisite requirement for increase in refrigerant concentration in the absorption liquid circuit. In such case, the requisite increase in refrigerant concentration in the absorption liquid circuit may be achieved after two or three interruptions of the heat supply to the generator. In practice, therefore, the pump 22 will be rendered active to withdraw a mixture of liquid refrigerant and absorption liquid from absorber vessel 39 and also from vessel 40 before the normal circulation of absorption liquid is modified to such an extent that all of the liquid to be transferred from boiler pipe 25 and absorber coil 17 can reach the vessel 39.

While provision is made in Fig. 4 to maintain the refrigerant concentration substantially uniform throughout the liquid body in vessel 40, a surface of liquid sometimes may form having an unduly high concentration of refrigerant. In such case it is desirable to shield the inert gas, which flows downwardly in conduit 14a, from coming in physical contact with the surface layer of absorption liquid in vessel 40. As shown in Fig. 5, this may be accomplished by providing a conduit 46 for flowing inert gas from the lower end of conduit 14a directly to the vapor space in absorber vessel 39. In Fig. 5 the vapor above the liquid body in vessel 40 is relatively stagnant since such vapor space is more or less of a dead-end branch of the portion of the inert gas circuit formed in vessel 39 and in which active circulation of inert gas normally takes place. An alternative arrangement is shown in Fig. 6 in which a conduit 47 is provided for conducting inert gas directly from the lower end of conduit 14a to the lower end of absorber coil 17. In the modifications of Figs. 5 and 6, the arrangements provided for shielding circulating inert gas from intimate contact with the liquid surface layer in vessel 40 achieve the result that no evaporation of refrigerant into inert gas can take place which possibly can disturb the efficiency of the absorber and also cause undesired transfer of accumulated refrigerant from the storage vessel 40 into the absorption liquid circuit.

It has been stated above that the quantity of liquid that can be held in the vessels 39 and 40 desirably is comparatively large, compared with the entire quantity of absorption liquid in the absorption liquid circuit of the system, so that, for the reasons given above, the concentration of refrigerant in the liquid body in vessel 40 will be maintained in a suitable range. Accordingly, in the preferred embodiments illustrated and described above, the quantity of liquid that can be held in the vessels 39 and 40 together desirably is at least fifty per cent of the entire quantity of absorption liquid required in the absorption liquid circuit of the system. It will also be seen that in each of the embodiments illustrated the quantity of liquid that can be held or stored in the vessel 40, which is connected to receive unevaporated refrigerant from evaporator 10, is as large as the quantity of liquid that can be held or stored in the vessel 39 which is connected to receive absorption liquid from the absorber coil 17.

Although several embodiments of the invention have been shown and described, it will be apparent to those skilled in the art that various modifications and changes may be made without departing from the spirit and scope of the invention. For example, several independent vessels may be employed as the absorber vessel and storage vessel for accumulating liquid refrigerant instead of employing a single partitioned container to provide such vessels as disclosed herein in the preferred embodiment. It is therefore contemplated to cover all modifications and changes which come within the true spirit of the invention, as pointed out in the following claims.

What is claimed is:

1. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated in a path of flow through and between the generator and absorber, the improvement which comprises the steps of maintaining a body of absorption liquid in a first place in the path of flow of such liquid, flowing liquid refrigerant in the system to a second place which serves as a place of accumulation for such liquid, a region of the body of liquid in said second place below its surface level and a region of the body of liquid in said first place below its surface level being in communication with one another in a path which is always completely filled with liquid, changing the quantity of absorption liquid maintained in said first place by modifying the circulation of absorption liquid, and flowing liquid refrigerant from said second place into the path of flow in which absorption liquid is circulated upon change in the quantity of absorption liquid maintained in said first place.

2. In the art of refrigeration employing a system in which heat is supplied to a generator to expel refrigerant vapor from absorption liquid therein, refrigerant vapor is converted to liquid in an air-cooled condenser, liquid refrigerant evaporates in the presence of an inert gas in an evaporator, refrigerant vapor is absorbed into absoption liquid in an air-cooled absorber, inert gas is circulated between the evaporator and absorber and absorption liquid is normally circulated in a circuit including the generator and absorber, the improvement which comprises the steps of adjusting the concentration of refrigerant in the absorption liquid circuit by withdrawing excess liquid refrigerant from the evaporator with variations in operating conditions which includes, for example, increase in ambient air temperature, storing such withdrawn liquid refrigerant at a place at which the surface level thereof will always rise and fall responsive to rise and fall, respectively, of the surface level of a body of absorption liquid in contact with inert gas and in the absorption liquid circuit and with which the stored liquid refrigerant is in communication through a path of flow which is always completely filled with liquid, supplying absorption liquid to said body of absorption liquid at a greater rate than that at which absorption liquid leaves said body by modifying the normal circulation of absorption liquid in its circuit, absorption liquid in said body, when said last-mentioned absorption liquid is being supplied thereto, flowing through the communicating path of flow to the place in which liquid refrigerant is stored, and withdrawing liquid from both the place in which liquid refrigerant is stored and said body of absorption liquid upon resumption of normal circulation of absorption liquid in its circuit.

3. In the art of refrigeration employing a system in which heat is supplied to a generator having a vapor lift pump to expel refrigerant vapor from absorption liquid therein, refrigerant vapor is converted to liquid in an air cooled condenser, liquid refrigerant evaporates in the presence of an inert gas in an evaporator, refrigerant vapor is absorbed into absorption liquid in an air cooled absorber, inert gas is circulated between the evaporator and absorber and absorption liquid is normally circulated with the aid of the vapor lift pump in a circuit which includes the generator and absorber, the improvement which comprises the steps of adjusting the concentration of refrigerant in the absorption liquid circuit by withdrawing excess liquid refrigerant from the evaporator with variations in operating conditions which includes, for example, increase in ambient air temperature, storing such withdrawn liquid refrigerant at a place at which the surface level thereof will always rise and fall responsive to rise and fall, respectively, of the surface level of a body of absorption liquid in the absorption liquid circuit into which absorption liquid passes from the absorber and into which circuit, during normal circulation of absorption liquid therein, stored liquid refrigerant can pass from said space only by diffusion through a communicating path of flow which is always completely filled with liquid, supplying absorption liquid to said body of liquid at a greater rate than that at which absorption liquid leaves said body upon cessation of heat supply to the vapor lift pump to render the latter inactive, and introducing the stored withdrawn liquid refrigerant into the absorption liquid circuit for flow to the generator, at a rate faster than that at which liquid refrigerant can be transferred by diffusion from said place to the absorption liquid circuit during normal circulation of absorption liquid therein, upon rise in the surface level of the stored liquid refrigerant responsive to rise in surface level of the body of absorption liquid.

4. In the art of refrigeration in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated in a path of flow through and between the generator and absorber, the specific weight of the liquid refrigerant being less than that of the absorption liquid, the improvement which comprises the steps of maintaining a body of absorption liquid in a first place in the path of flow of absorption liquid, maintaining in a second place another body of absorption liquid, a region of the body of absorption liquid in the second place below its surface level and a region of the body of liquid in the first place below its surface level being in communication with one another in a path which is always completely filled with liquid, flowing liquid refrigerant in the system to the second place which serves as a place of accumulation for such refrigerant, the surface level of the body of absorption liquid at the first place being lower than the surface level of the body of liquid at the second place when liquid refrigerant has accumulated therein, and flowing absorption liquid to the first place to cause the liquid surface thereof and also the liquid surface at the place of accumulation to rise, and, when the liquid surface at the second place rises to a predetermined level due to flow of absorption liquid into the first place, overflowing liquid refrigerant from the second place into the path of flow in which absorption liquid is circulated.

5. An hermetically closed absorption refrigeration system containing refrigerant, inert gas and absorption liquid, said system comprising circuits for circulation of the aforementioned fluids, the circuit for circulation of absorption liquid including a first vessel for holding a body of such liquid and having an inlet and outlet for the liquid, said first vessel through which flow of absorption liquid is effected from the inlet to the outlet thereof forming an active portion of the absorption liquid circuit in which the liquid normally circulates during operation of the system, a second vessel, the system including connections for conducting liquid refrigerant to said second vessel, the surface level of liquid in said second vessel always rising and falling responsive to rise and fall, respectively, of the surface level of the liquid in said first vessel by passage means which connects said first and second vessels and is completely filled with liquid under all operating conditions of the system, said absorption liquid circuit embodying provisions whereby absorption liquid is transferred to said first vessel when the normal circulation of absorption liquid in the active portion thereof is modified, structure disposed externally of the system which is operable to modify the normal circulation of absorption liquid in the active portion thereof and effect transfer of absorption liquid to said first vessel, and means responsive to transfer of absorption liquid to said first vessel for effecting removal of liquid refrigerant from said second vessel to the active portion of said absorption liquid circuit in a path of flow other than that provided by said passage means for establishing free liquid communication between said first and second vessels.

6. An hermetically closed absorption refrigeration system containing refrigerant, inert gas and absorption liquid, said system comprising circuits for circulation of the aforementioned fluids, the circuit for circulation of absorption liquid including a generator and a first vessel for holding a body of such liquid and having an inlet and outlet for the liquid, said first vessel through which flow of absorption liquid is effected from the inlet to the outlet thereof forming an active portion of the absorption liquid circuit in which the liquid normally circulates during operation of the system, the circuit for inert gas having said first vessel in communication therewith, a second vessel for holding a body of absorption liquid, the surface level of liquid in said second vessel always rising and falling responsive to rise and fall, respectively, of the surface level of the liquid in said first vessel by passage means which connects said first and second vessels and is completely filled with liquid under all operating conditions of the system, said second vessel constituting a part in which normal flow of absorption liquid is absent and which is disposed outside the active portion of said absorption liquid circuit, the system including connections for conducting liquid refrigerant to said second vessel, said absorption liquid circuit embodying provisions whereby absorption liquid is transferable to said first vessel, structure disposed externally of the system which is operable to effect transfer of absorption liquid to said first vessel, said passage means serving as a path of flow through which liquid passes from said first vessel to said second vessel responsive to transfer of absorption liquid to said first vessel to mix liquid refrigerant in said second vessel with absorption liquid, the quantity of absorption liquid that can be held in said first vessel and the quantity of liquid that can be held in said second vessel together comprising at least fifty percent of the quantity of absorption liquid in the absorption liquid circuit of the system, and said circuit for absorption liquid including provisions for flowing said mixture of liquid refrigerant and absorption liquid to said generator.

7. An absorption refrigeration system as set forth in claim 6 in which said absorption liquid circuit includes an absorber comprising piping providing an elongated path of flow for absorption liquid and in which refrigerant is absorbed into absorption liquid, said first vessel being connected to receive absorption liquid enriched in refrigerant from said absorber piping.

8. An absorption refrigeration system as set forth in claim 7 in which the quantity of liquid that can be held in said second vessel comprises more than one-third of the combined quantity of liquid that can be held in said first and second vessels.

9. An hermetically closed absorption refrigeration system containing refrigerant, inert gas and absorption liquid, said system comprising circuits for circulation of the aforementioned fluids, said refrigerant circuit including an evaporator, the circuit for circulation of absorption liquid including a generator and a first vessel for holding a body of absorption liquid and having an inlet and outlet for the liquid, said first vessel through which flow of absorption liquid is effected from the inlet to the outlet thereof forming an active portion of the absorption liquid circuit in which the liquid normally circulates during operation of the system, the circuit for inert gas having said first vessel in communication therewith, a second vessel for holding a body of absorption liquid, the surface level of liquid in said second vessel always rising and falling responsive to rise and fall, respectively, of the surface level of the liquid in said first vessel by passage means which connects said first and second vessels and is completely filled with liquid under all operating conditions of the system, the system including connections for conducting unevaporated liquid refrigerant from said evaporator to said second vessel and form a part of the liquid body therein, said absorption liquid circuit embodying provisions whereby absorption liquid is transferable to said first vessel when the normal circulation of absorption liquid in the active portion thereof is reduced, said passage means serving as a path of flow through which liquid passes from said first vessel to said second vessel responsive to transfer of absorption liquid to said first vessel to mix liquid refrigerant in said second vessel with absorption liquid, the quantity of liquid that can be held in said second vessel being at least as large as the quantity of liquid that can be held in said first vessel, and said circuit for absorption liquid including provisions for flowing said mixture of liquid refrigerant and absorption liquid to said generator.

10. An hermetically closed absorption refrigeration system containing refrigerant, inert gas and absorption liquid, said system comprising circuits for circulation of the aforementioned fluids, the circuit for circulation of absorption liquid comprising a vapor expulsion unit including a pump for raising liquid by vapor lift action, an absorber comprising piping providing an elongated path of flow for liquid, said absorption liquid circuit further including a first vessel for holding a body of absorption liquid and having an inlet connected to receive liquid from said absorber piping and an outlet for the liquid, said first vessel through which flow of absorption liquid is effected from the inlet to the outlet thereof forming an active portion of the absorption liquid circuit in which the liquid normally circulates during operation of the system, a second vessel, the system including connections for conducting liquid refrigerant to said second vessel, the surface level of liquid in said second vessel always rising and falling responsive to rise and fall, respectively, of the surface level of the liquid in said first vessel by passage means which connects said first and second vessels and is completely filled with liquid under all operating conditions of the system, said absorption liquid circuit embodying provisions whereby absorption liquid flows from said vapor expulsion unit and said absorber piping to said first vessel to transfer such absorption liquid thereto when said pump is rendered inactive to raise liquid by vapor lift action, said passage means serving as a path of flow through which liquid passes from said first vessel to said second vessel responsive to transfer of absorption liquid to said first vessel to mix liquid refrigerant in said second vessel with absorption liquid, the quantity of absorption liquid that can be held in said first vessel and the quantity of liquid that can be held in said second vessel together comprising at least fifty percent of the quantity of absorption liquid in the absorption liquid circuit of the system, and said circuit for absorption liquid including provisions for flowing said mixture of liquid refrigerant and absorption liquid to said vapor expulsion unit when said pump is rendered active.

11. An hermetically closed absorption refrigeration system containing refrigerant, inert gas and absorption liquid, said system comprising circuits for circulation of the aforementioned fluids, said refrigerant circuit including an evaporator, an elongated horizontally extending vessel having vertically disposed wall means therein to provide first and second spaces, the circuit for circulation of absorption liquid including a generator, an absorber comprising piping providing an elongated path of flow for liquid, said absorption liquid circuit further including said first space having an inlet communicating with said absorber piping and an outlet, said first space through which flow of absorption liquid is effected from the inlet to the outlet thereof being constructed and arranged to hold a body of absorption liquid and forming an active portion of the absorption liquid circuit in which the liquid normally circulates during operation of the system, said second space also holding a body of absorption liquid, the surface level of liquid in said second space always rising and falling responsive to rise and fall, respectively, of the surface level of the liquid in said first space by passage means which connects said first and second spaces and is completely filled with liquid under all operating conditions of the system, the system embodying means for conducting unevaporated liquid refrigerant from said evaporator to said second space and form a part of the liquid body therein, said absorption liquid circuit embodying provisions whereby absorption liquid is transferable to said first space when the normal circulation of absorption liquid in the active portion thereof is modified, and means including said passage means for flowing liquid therethrough from said first space to said second space responsive to transfer of absorption liquid to said first space to mix the liquid refrigerant in said second space with absorption liquid, the quantity of liquid that can be held in said second space being at least as large as the quantity of liquid that can be held in said first space, and said circuit for absorption liquid including provisions for flowing said mixture of liquid refrigerant and absorption liquid to said generator.

12. An absorption refrigeration system comprising circuits for circulation of refrigerant, inert gas and absorption liquid, the circuit for inert gas including an evaporator and an absorber, the circuit for circulation of absorption liquid including a generator, said absorber and a first vessel having an inlet communicating with the absorber and an outlet, said first vessel through which flow of absorption liquid is effected from the inlet to the outlet thereof being constructed and arranged to hold a body of absorption liquid and forming an active portion of the absorption liquid circuit in which the liquid normally circulates during operation of the system, a second vessel, the system embodying means for conducting unevaporated liquid refrigerant from said evaporator to said second vessel and for flowing inert gas from said evaporator to said absorber in a path of flow in which circulating inert gas avoids coming in direct physical contact with the surface level of the liquid in said second vessel, means establishing free liquid communication between said first and second vessels beneath the surface levels of the bodies of liquid therein, said absorption liquid circuit embodying provisions whereby absorption liquid is transferable to said first vessel when the normal circulation of absorption liquid in the active portion thereof is modified, said free liquid communication serving as a path in which liquid passes therethrough from said first vessel to said second vessel responsive to transfer of absorption liquid to said first vessel to mix the liquid refrigerant in said second vessel with absorption liquid, and said circuit for absorption liquid including provisions for flowing said mixture of liquid refrigerant and absorption liquid to said generator.

13. An absorption refrigeration system comprising circuits for circulation of refrigerant, inert gas and absorption liquid, the circuit for inert gas including an evaporator, the circuit for circulation of absorption liquid including a generator and a first vessel for holding a body of absorption liquid and having an inlet and outlet for the liquid, said first vessel through which flow of absorption liquid is effected from the inlet to the outlet thereof forming an active portion of the absorption liquid circuit in which the liquid normally circulates during operation of the system, a second vessel, the system embodying means for conducting unevaporated liquid refrigerant from said evaporator to said second vessel, means establishing free liquid communication between said first and second vessels beneath the surface levels of the bodies of liquid therein, said absorption liquid circuit embodying provisions whereby absorption liquid is transferable to said first vessel when the normal circulation of absorption liquid in the active portion thereof is modified, said free liquid communication serving as a path of flow in which liquid passes therethrough from said first vessel to said second vessel responsive to transfer of absorption liquid to said first vessel to mix the liquid refrigerant in said second vessel with absorption liquid, said circuit for absorption liquid including provisions for flowing said mixture of liquid refrigerant and absorption liquid to said generator, and said means for conducting refrigerant to said second vessel including a conduit from which liquid refrigerant passes into the liquid body in said second vessel at a region between the liquid surface level and extreme bottom portion thereof, such conduit having an opening above the liquid surface level in said vessel to vent vapor therefrom.

14. An hermetically closed absorption refrigeration system containing refrigerant, inert gas and absorption liquid, said system comprising circuits for circulation of the aforementioned fluids, the circuit for circulation of absorption liquid comprising a heat receiving part including a pump for raising liquid by vapor lift action, an absorber and a first vessel for holding a body of absorption liquid and having an inlet communicating with the absorber and an outlet, a heater for supplying heat to said heat receiving part, control means for controlling said heater, said first vessel through which flow of absorption liquid is effected from the inlet to the outlet thereof forming an active portion of the absorption liquid circuit in which the liquid normally circulates during operation of the system, the circuit for inert gas having said first vessel in communication therewith, a second vessel, the system embodying means for conducting liquid refrigerant to said second vessel, the surface level of liquid in said second vessel always rising and falling responsive to rise and fall, respectively, of the surface level of the liquid in said first vessel by passage means which connects said first and second vessels and is completely filled with liquid under all operating conditions of the system, said absorption liquid circuit embodying provisions whereby absorption liquid flows and is transferable to said first vessel from another portion of said circuit when said control means is actuated to reduce the rate at which heat is supplied to said heat receiving part to render said pump substantially ineffective to raise liquid by vapor lift action, said passage means serving as a path of flow through which liquid passes from said first vessel to said second vessel responsive to transfer of absorption liquid to said first vessel to mix the liquid refrigerant in said second vessel with absorption liquid, and said circuit for absorption liquid including provisions for flowing said mixture of liquid refrigerant and absorption liquid to said heat receiving part when said pump is rendered effective to raise liquid by vapor lift action.

15. In the art of refrigeration employing a system in which heat is supplied to a generator having a vapor lift pump to expel refrigerant vapor from absorption liquid therein, refrigerant vapor is converted to liquid in an air-cooled condenser, liquid refrigerant evaporates in the presence of an inert gas in an evaporator, refrigerant vapor is absorbed into absorption liquid in an air-cooled absorber, inert gas is circulated between the evaporator and absorber and absorption liquid is normally circulated with the aid of the vapor lift pump in a circuit including the generator and absorber, the improvement which comprises the steps of adjusting the concentration of refrigerant in the absorption liquid circuit by withdrawing excess liquid refrigerant from the evaporator with variations in operating conditions which includes, for example, increase in ambient air temperature, storing such withdrawn liquid refrigerant at a place at which the surface level thereof will always rise and fall responsive to rise and fall, respectively, of the surface level of a body of absorption liquid in contact with inert gas and in a part of the absorption liquid circuit into which absorption liquid passes from the absorber and into which circuit, during normal circulation of absorption liquid therein, stored liquid refrigerant can pass only by diffusion through a communicating path of flow which is always completely filled with liquid, supplying absorption liquid to said body of absorption liquid at a greater rate than that at which absorption liquid leaves said body upon a reduction of heat supply to the vapor lift pump which renders the latter inactive, absorption liquid in said body, when said last-mentioned absorption liquid is being supplied thereto, flowing through the communicating path of flow to the place in which liquid refrigerant is stored, and withdrawing liquid from both the place in which liquid refrigerant is stored and said body of absorption liquid upon increase of heat supply to the vapor lift pump to render the latter active, said last-mentioned withdrawal of liquid transferring the stored liquid refrigerant from said place into the absorption liquid circuit for flow to the generator at a rate faster than that at which liquid refrigerant can be transferred by diffusion from said place to the absorption liquid circuit during normal circulation of absorption liquid therein.

16. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is normally circulated in a path of flow through and between the generator and absorber, the improvement which comprises the steps of providing bodies of absorption liquid at first and second places which are in free liquid communication with one another below the surface levels thereof in a path which is always completely filled with liquid, maintaining only the liquid body in said first place in an active portion of said path of flow for absorption liquid, the liquid body in said second place being in intimate physical contact with absorption liquid in the active portion of its path of flow only at said free communication and during normal circulation of absorption liquid essentially forming a stagnant liquid body, flowing liquid refrigerant in the system to said second place which serves as a region in which such liquid is accumulated, redistributing the absorption liquid in the system to transfer such liquid to said first place, mixing accumulated liquid refrigerant and absorption liquid by flowing absorption liquid from the first place to the second place through said free liquid communication responsive to transfer of absorption liquid to said first place, flowing said mixture of liquid refrigerant and absorption liquid in said path of flow to said generator, and thereafter again providing said bodies of absorption liquid in said first and second places responsive to normal circulation of absorption liquid in its path of flow.

17. The improvement set forth in claim 16 in which the transfer of absorption liquid to said first place is effected intermittently in several steps by redistribution of absorption liquid in the system and the mixing of accumulated liquid refrigerant and absorption liquid responsive to such transfer of absorption liquid to said first place also is effected intermittently in several steps.

18. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is normally circulated in a path of flow through and between the generator and absorber, the improvement which comprises the steps of flowing absorption liquid in the absorber by gravity in an elongated path having an inlet and an outlet and in which liquid tends to collect due to capillary and adhesive forces during normal circulation before liquid flows from the outlet thereof, providing bodies of absorption liquid at first and second places which are in free liquid communication with one another below the surface levels thereof in a path which is always completely filled with liquid, maintaining the liquid body in said first place in contact with inert gas and also in an active portion of said path of flow for absorption liquid, the liquid body in said second place being in intimate physical contact with absorption liquid in the active portion of its path of flow only at said free communication and during normal circulation of absorption liquid essentially forming a stagnant liquid body, flowing liquid refrigerant in the system to said second place which serves as a region in which such liquid is accumulated, terminating the normal circulation of absorption liquid in its path of flow to transfer to said first place from elsewhere in the system absorption liquid which includes the liquid tending to collect in the elongated path of said absorber during normal circulation of absorption liquid, mixing accumulated liquid refrigerant and absorption liquid by flowing liquid from said first place to said second place through said free liquid communication responsive to transfer of absorption liquid to said first place, initiating normal circulation of absorption liquid in its path of flow to flow said mixture of liquid refrigerant and absorption liquid to said generator, and thereafter again providing said bodies of absorption liquid in said first and second places responsive to normal circulation of absorption liquid in its path of flow.

19. In the art of refrigeration with the aid of a system in which refrigerant vapor is expelled from absorption liquid in a generator, refrigerant vapor is liquefied, liquid refrigerant evaporates in the presence of an inert gas in an evaporator, refrigerant vapor is absorbed into absorption liquid in an absorber, inert gas is circulated between the evaporator and absorber and absorption liquid is circulated in a path of flow through and between the generator and absorber, the improvement which comprises the steps of providing bodies of absorption liquid at first and second places which are in free liquid communication with one another below the liquid surface levels thereof in a path which is always completely filled with liquid, maintaining the liquid body in said first place in contact with inert gas and also in said path of flow of absorption liquid, maintaining the liquid body at the second place at least as large as the liquid body in the first place, flowing liquid refrigerant in the system to the second place, redistributing the absorption liquid in the system to transfer absorption liquid to said first place, effecting mixing of accumulated liquid refrigerant and absorption liquid responsive to transfer of absorption liquid to said first place and flow of absorption liquid through said free liquid communication from a region beneath the surface level of the liquid body at said first place to a region beneath the surface level of the liquid body at said second place, and, after said mixing of accumulated liquid refrigerant and absorption liquid, withdrawing liquid from both of the liquid bodies in said first and second places and circulating such withdrawn liquid in said path of flow of absorption liquid.

20. An absorption refrigeration system as set forth in claim 11 in which an opening in said wall means provides said passage means which is always completely filled with liquid for establishing free liquid communication between said first and second spaces.

21. An absorption refrigeration system as set forth in claim 11 in which said means to mix liquid refrigerant with absorption liquid includes an opening in said wall means through which liquid can overflow from said second space to said first space responsive to transfer of absorption liquid to said first space.

References Cited in the file of this patent

UNITED STATES PATENTS

| | | |
|---|---|---|
| 1,924,770 | Backstrom | Aug. 29, 1933 |
| 2,210,609 | Ullstrand | Aug. 6, 1940 |
| 2,246,665 | Buffington | June 24, 1941 |
| 2,329,863 | Thomas | Sept. 21, 1943 |
| 2,465,904 | McNeely | Mar. 29, 1949 |
| 2,501,606 | Kogel | Mar. 21, 1950 |
| 2,583,722 | Berestneff | Jan. 29, 1952 |